(12) United States Patent
Lehner et al.

(10) Patent No.: US 10,574,554 B2
(45) Date of Patent: Feb. 25, 2020

(54) CONTROL OF APPLICATIONS THAT USE SYSTEM RESOURCES

(71) Applicant: Microsoft Technology Licensing, LLC, Redmond, WA (US)

(72) Inventors: Randall Allen Lehner, Redmond, WA (US); Preetam Nithyanand Shetty, Kirkland, WA (US); Robert Michael Samer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 15/145,000

(22) Filed: May 3, 2016

(65) Prior Publication Data
US 2017/0324633 A1    Nov. 9, 2017

(51) Int. Cl.
*H04L 12/26* (2006.01)
*G06F 9/50* (2006.01)

(52) U.S. Cl.
CPC ........ *H04L 43/0876* (2013.01); *G06F 9/5061* (2013.01); *H04L 43/16* (2013.01); *G06F 2209/504* (2013.01)

(58) Field of Classification Search
CPC ..... G06F 2203/04803; G06F 2209/508; G06F 2212/1044; G06F 2212/314; G06F 2212/603; G06F 3/01; G06F 3/016; G06F 3/017; H04L 47/70; H04L 67/10; H04L 43/0876; H04L 67/1097; H04L 43/16; H04L 43/04; H04L 43/08; H04L 67/22; H04L 41/0893; H04L 41/24; H04L 43/045; H04L 41/22; H04L 5/0053; H04L 5/001; H04L 5/0098; H04L 5/0091; H04L 1/1812; H04L 5/00; H04L 5/0007; H04L 5/0032; H04L 5/0057; H04L 67/02; H04L 67/34;

(Continued)

(56) References Cited

U.S. PATENT DOCUMENTS 7,519,725 B2    4/2009  Alvarez et al.
7,784,054 B2    8/2010  Monasterio
(Continued)

FOREIGN PATENT DOCUMENTS

EP    1426861 A2    6/2004

OTHER PUBLICATIONS

Configuring Emergency Throttle; 2 pages.
(Continued)

*Primary Examiner* — Djenane M Bayard
(74) *Attorney, Agent, or Firm* — Schwegman Lundberg & Woessner, P.A.

(57) ABSTRACT

System resources on a computer system are conserved by controlling the applications that use those system resources. This can be accomplished by monitoring an indication of use of a system resource by a plurality of applications, determining whether the indication of use exceeds a predetermined threshold of use, if the indication of use exceeds the predetermined threshold of use then bundling the applications using that system resource into a resource group, and assigning a resource usage rate to the resource group for a period of time, the assigned resource usage rate being below the indication of use of that system resource, and the assigned resource usage rate applying collectively to the applications in the resource group.

20 Claims, 6 Drawing Sheets

(58) Field of Classification Search
CPC ..... H04L 5/0055; H04L 67/06; H04L 1/0026; H04L 27/0006; H04L 5/0048; H04L 5/0094; H04L 43/0817; H04L 63/20; H04L 41/0896; H04L 63/101; H04L 41/12; H04L 43/026; H04L 63/0281; H04L 63/10; H04L 63/1416; H04L 12/66; H04L 47/25; H04L 67/322; H04L 67/42; H04L 12/14; H04L 12/1403; H04L 12/1407; H04L 41/5009; H04L 41/5019; H04L 63/0263; H04L 12/1435; H04L 47/22; H04L 47/2425; H04L 63/02; H04L 41/06; H04L 41/069; H04L 41/5012; H04L 41/5054; H04L 47/10; H04L 47/564; H04L 69/329; H04L 29/06; H04L 65/1046; H04L 65/1069; H04L 65/4069; H04L 65/602; H04L 65/607; H04L 65/80; H04L 12/2856

See application file for complete search history.

(56) References Cited

U.S. PATENT DOCUMENTS

| | | | |
|---|---|---|---|
| 8,615,589 B1* | 12/2013 | Adogla | G06F 9/5077 709/226 |
| 8,732,307 B1* | 5/2014 | Zhu | H04L 29/08144 709/226 |
| 8,782,224 B2 | 7/2014 | Pijewski et al. | |
| 8,832,063 B1 | 9/2014 | Dean | |
| 9,015,662 B2 | 4/2015 | Oslake et al. | |
| 9,063,795 B2 | 6/2015 | Bird et al. | |
| 9,141,441 B2 | 9/2015 | Fletcher et al. | |
| 2006/0195827 A1* | 8/2006 | Rhine | G06F 9/5088 717/140 |
| 2010/0042996 A1* | 2/2010 | Corry | G06F 11/3409 718/100 |
| 2010/0186010 A1* | 7/2010 | Chalemin | G06F 9/45533 718/1 |
| 2011/0238857 A1 | 9/2011 | Certain et al. | |
| 2012/0260259 A1 | 10/2012 | Parthasarathy et al. | |
| 2013/0003538 A1 | 1/2013 | Greenberg et al. | |
| 2013/0097605 A1* | 4/2013 | Martinka | G06F 9/485 718/100 |
| 2013/0173780 A1 | 7/2013 | Ditto et al. | |
| 2013/0238780 A1* | 9/2013 | Devarakonda | G06F 9/5072 709/224 |
| 2014/0201751 A1 | 7/2014 | Bird et al. | |
| 2015/0095485 A1 | 4/2015 | Alatorre et al. | |
| 2015/0381453 A1 | 12/2015 | Skjolsvold et al. | |
| 2017/0250919 A1* | 8/2017 | Kessel | H04L 67/1097 |

OTHER PUBLICATIONS

"Designing Large Lists and Maximizing List Performance"; published Dec. 18, 2012; 26 pages.

"Fairness via Throttling Policies" published Oct. 24, 2014; 8 pages.

Wendy Powley, Patrick Martin, Mingyi Zhang, Paul Bird, Keith McDonald. "Autonomic Workload Execution Control Using Throttling"—Published Date: Mar. 1, 2010 ; Proceedings: In Proceedings of IEEE 26th International Conference on Data Engineering Workshops ;pp. 6.

Tianfield, Huaglory, "Cloud Computing Architectures", published date Oct. 9, 2011; In Proceedings of IEEE International Conference on Systems, Man, and Cybernetics ; 6 ages.

International Search Report and Written Opinion Issued in PCT Application No. PCT/US2017/029545, dated Jul. 24, 2017, 11 Pages.

* cited by examiner

CONTROL OF APPLICATIONS THAT USE SYSTEM RESOURCES

BACKGROUND

Multiple applications running on a computer system share the need for certain system resources such as, but not limited to, central processing unit (CPU) time, memory (particularly but not limited to random access memory (RAM), input/output (I/O) bus operations, and even other applications or processes. A problem can occur if too many applications, even if well-behaved, are competing for a shared system resource, or if an application is not well-behaved and attempts to consume an excessive portion of the shared system resource(s).

For example, a company can provide a cloud service that allows consumers to access popular applications, such as but not limited to an email application, a word processing application, a financial spreadsheet application, a game, a drawing program, etc. Each time a consumer accesses the application, a new instance of that application can be opened on a virtual machine, with many virtual machines running on a server operated by that company, and with there often being numerous such servers on one or more server farms.

If only one or two consumers are accessing an application, for example the email application, then the server running the virtual machines that are running the instances of the email application will not be burdened, at least not by those instances. If, however, a thousand, two thousand, five thousand, etc., consumers are simultaneously accessing the email application, then the server(s) involved might not have sufficient resources to accommodate these numerous virtual machines and/or instances of the email program, in which case the system might be in "distress", as manifested by, for example, perceived system performance, e.g., speed will suffer and, in extreme cases, errors can occur, e.g., time-out errors due to the instance of the application not responding in time to a remote system.

Further, as consumers in a particular geographic area have roughly similar schedules, e.g., similar working hours, similar evening hours at home, there will be peak usage times when large numbers of consumers on simultaneously online, such as the evening hours, and other times when very few consumers are on online, such as between midnight and dawn. The number of instances of an application being in use can vary greatly depending upon the time of the day, the day of the week, the month, etc.

In addition, cloud services often employ continuous deployment and installation of updates to applications in order quickly make releases of new features available to the consumers, often without any change in the capacity of the system resources. If an update is not well-behaved and attempts to consume an excessive portion of the shared resource(s) then system distress can occur, i.e., system performance can suffer and errors can occur.

Further, as computers become faster, applications, processes, and updates associated with applications can be written with a particular new processor capability and speed and memory speed (resources) in mind, but such applications and processes actually can be installed and run on older systems that do not have those enhanced resources. Thus, such applications and processes can attempt to consume an excessive portion of the shared resource(s), especially on, but not limited to, older systems.

Such excessive system resource consumption can exhaust the system resources, and seriously slow other applications or processes, including system processes, even to the point where failures and cascading failures occur. This can result in loss or corruption of data and even prevent system error logging, thereby making it difficult or impossible to determine the cause of the failure.

SUMMARY

Technologies are described herein for conserving system resources by controlling applications that use those system resources. For example, a computer-implemented method comprises monitoring an indication of use of a system resource by a plurality of applications, determining whether the indication of use exceeds a predetermined threshold of use, if the indication of use exceeds the predetermined threshold of use: bundling the applications using that resource into a resource group, and assigning a resource usage rate to the resource group for a first period of time, the assigned resource usage rate being below the indication of use of that resource, and the assigned resource usage rate applying collectively to the applications in the resource group.

An apparatus is also provided that comprises a plurality of resources, a processor, and at least one computer-readable storage medium having computer executable instructions stored thereon. The computer executable instructions, when executed by the processor, cause the apparatus to run a plurality of applications, monitor an indication of use of a resource of the plurality of resources by the plurality of applications, determine whether the indication of use exceeds a predetermined threshold of use, if the indication of use exceeds the predetermined threshold of use bundle the applications using that resource into a resource group, and assign a resource usage rate to the resource group for a first period of time, the assigned resource usage rate being below the indication of use of that resource, and the assigned resource usage rate applying collectively to the applications in the resource group.

A computer-readable storage medium is also provided that has computer executable instructions stored thereon. The computer executable instructions, when executed by a processor, cause the processor to: run a plurality of applications, monitor an indication of use of a resource of the plurality of resources by the plurality of applications, determine whether the indication of use exceeds a predetermined threshold of use, if the indication of use exceeds the predetermined threshold of use: bundle the applications using that resource into a resource group, and assign a resource usage rate to the resource group for a first period of time, the assigned resource usage rate being below the indication of use of that resource, and the assigned resource usage rate applying collectively to the applications in the resource group.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

As disclosed herein, applications running in a shared resource environment are allowed to consume the system resources they need until the system is determined to be in distress due to excessive use of one or more resources. That is, until the system is in distress and is at risk of providing poor performance or even suffering from errors or failures. If the system is determined to be in distress, then the applications consuming an over-utilized resource are treated (bundled) as a single component or process subject to a group resource usage cap, i.e., an emergency or distress resource usage limit or cap. The term "system resources", which includes computer resources and machine resources, is sometimes referred to herein simply as "resources" for brevity of expression.

Applications in the resource group can continue to make requests for the resource, but the applications, as a group, and each application in the resource group, will be subject to that distress resource usage limit. Adverse effects on system performance from overuse of a resource are thereby constrained, and customers do not experience a service disruption. Once the system has recovered, that is, the affected resource is not being over-utilized, the applications are unbundled (released from the resource group). The released applications are then allowed to resume making individual requests for the resource, and these requests are no longer subject to the group resource usage cap.

Figure 1:
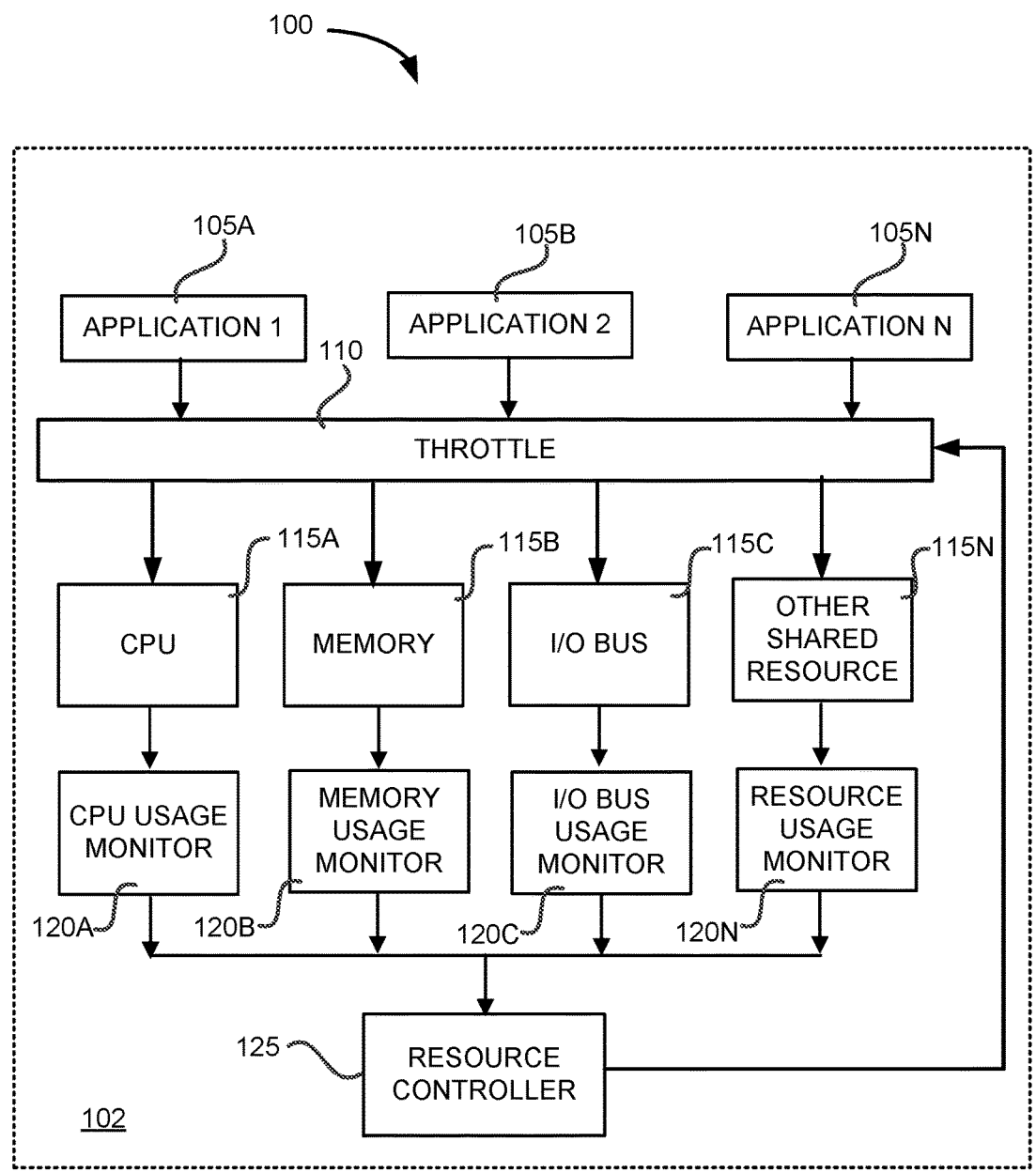
FIG. 1 is an illustration of an exemplary operating environment wherein consumption of system resources of a system by various applications is controlled.

FIG. 1 is an illustration of an exemplary operating environment 100 wherein the consumption of system resources of a system 102 by various applications is controlled. Shown are a plurality of applications or processes 105A-105N (collectively, applications 105, or individually, application 105, as the context might require). The applications 105 use (consume) one or more resources, such as the CPU 115A, the memory 115B, the I/O bus 115C, or other shared resource 115N (collectively, resources 115, or individually, resource 115, as the context might require).

Figure 4:
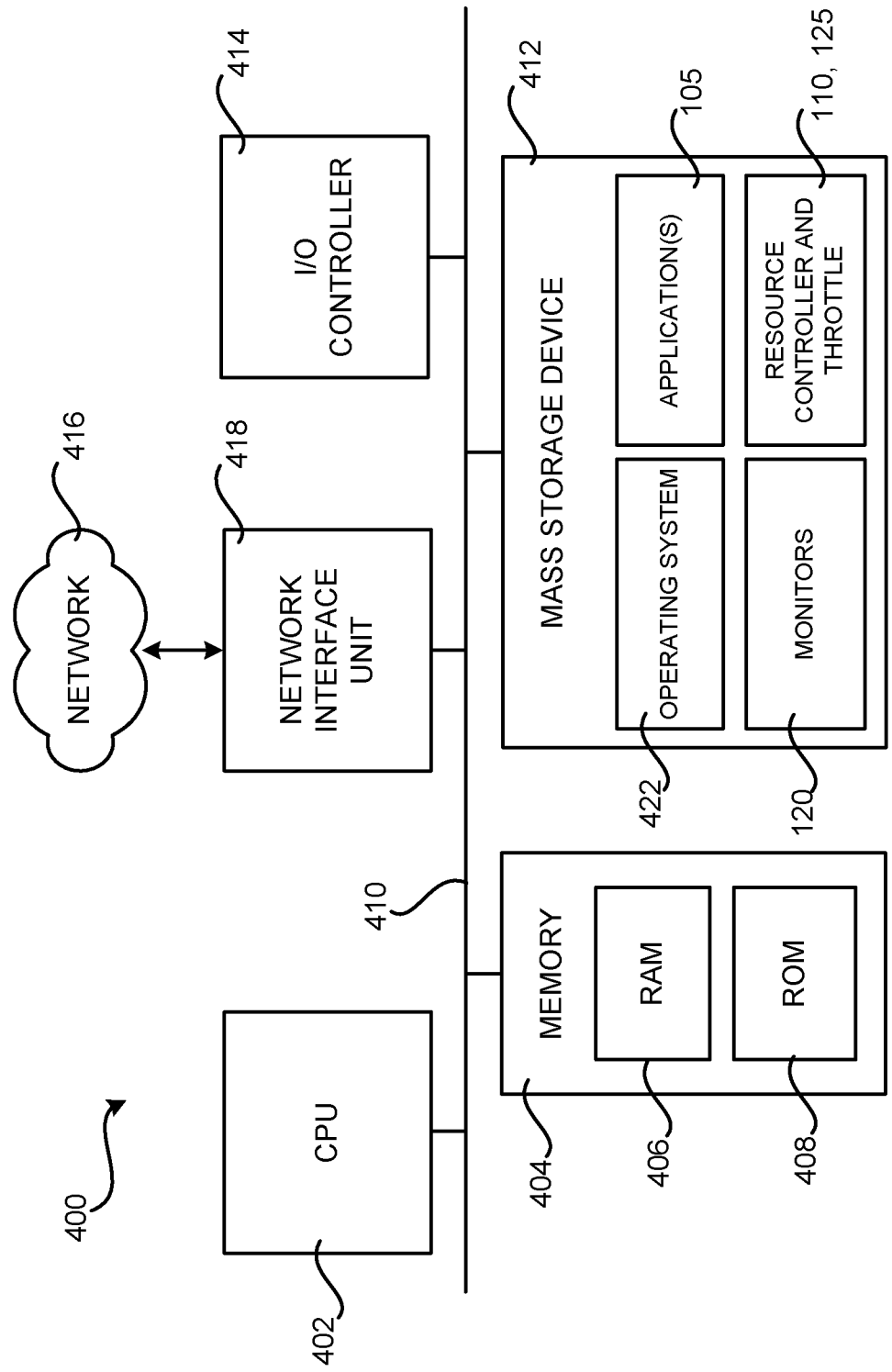
FIG. 4 is a computer architecture diagram illustrating an illustrative computer hardware and software architecture for a computing system capable of implementing aspects of the technologies presented herein.
Figure 5:
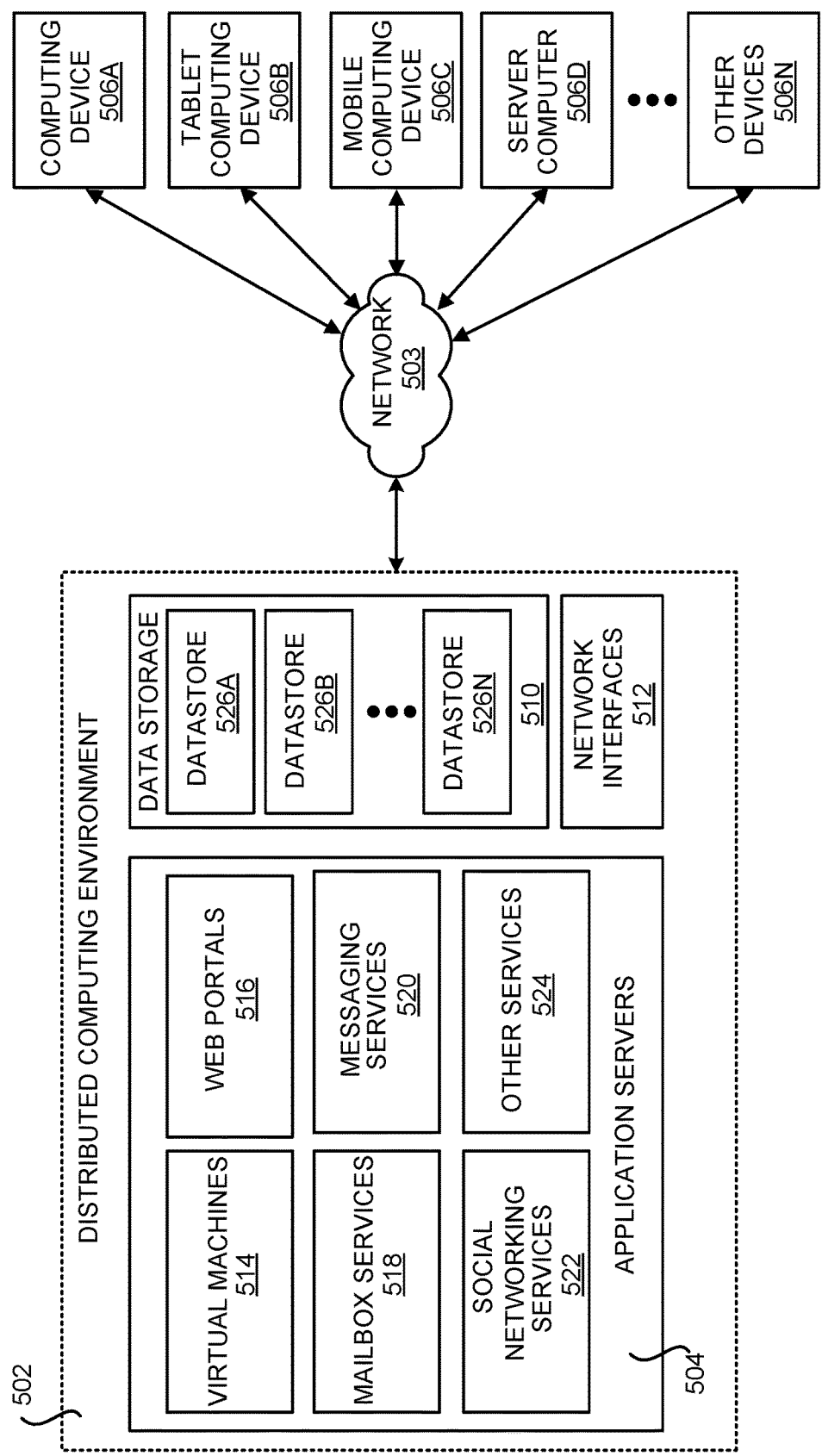
FIG. 5 shows aspects of an illustrative distributed computing environment in which the software components described herein can be executed.
Figure 6:
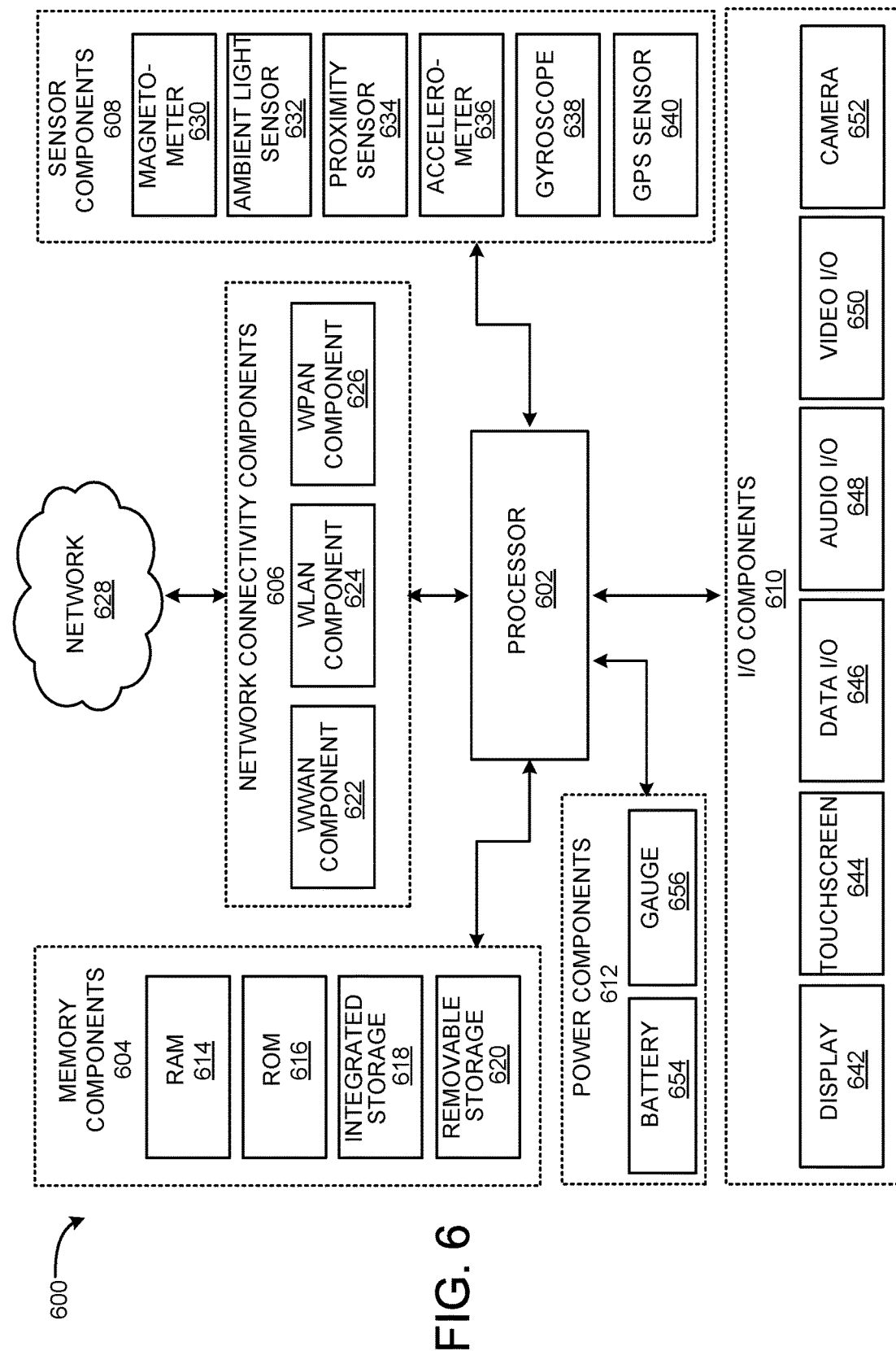
FIG. 6 shows an illustrative computing device architecture for a computing device that is capable of executing the various software components described herein.

System resources can be hardware resources, software resources, or both, as desired for a particular operating environment. Hardware resources include, by way of example but not of limitation, the CPU, RAM, storage devices, monitors, the I/O bus, and other hardware such as shown in FIGS. 4 and 6. Software resources include, by way of example but not of limitation, processes, virtual machines, libraries, databases, applications, such as but not limited to a process for three-dimensional rotation of an object, and other software such as shown in FIGS. 5 and 6. The operation of the various resources 115 is monitored by a plurality of usage monitors, such as a CPU usage monitor 120A, a memory usage monitor 120B, and I/O bus monitor 120C, or other resource usage monitor 120N (collectively, monitors 120, or individually, monitor 120, as the context might require). In one implementation, these monitors 120 are implemented by using Microsoft™ Windows™ kernel application programming interfaces (APIs) to query resource utilization, such as the memory and the CPU. In this implementation a separate query is made for each instance of an application.

The monitors 120 can also be implemented by other processes that run on the CPU 115A, can be hardware devices, or can be software that is run on a different CPU, which might or might not also be a shared resource, such as a resource 115N. The output of a particular monitor 120 can be an absolute value, e.g., X CPU operations in the last time period, or Y Megabytes of memory in the last time period, or can be a relative value, e.g., 1% of CPU time, 2% of memory was used, etc.

The resource controller 125 receives the outputs from the various monitors 120, sums them, to determine the total load for a resource, and compares the total to a threshold (the "distress threshold") to determine whether the system is in distress, i.e., one or more resources have little or no availability. The distress threshold for any resource 115 can be fixed or can be user-selectable. Also, the distress threshold for a computer system operating in one environment can be very different than the distress threshold for a computer system operating in another environment. For example, a computer system running a predetermined number of applications with a known history of resource consumption can have a high distress level setting because the system normally operates within a narrow range of resource consumption. Another computer system, however, such as one that services gaming applications, can be subject to extremes in resource usage depending upon the current popularity of a game, the time of day, whether a day is a holiday, etc., and so might have low distress level setting in order to accommodate a rapid increase in resource consumption.

Further, the distress threshold for one resource can be different than the distress threshold for another resource, even if the resource type is of the same or similar type. For example, two separate memory resources can each have a different distress threshold due to, for example, their speed and their capacity. When the resource controller 125 determines that the usage of a system component or resource exceeds the distress threshold for that particular resource then the resource controller 125 creates bundles the applications using that resource into a resource group.

In one implementation, control (management) of applications using system resources, and conservation of those system resources, is accomplished by placing those applications into a resource group when the distress level threshold is reached or exceeded. For example, all instances of an email program can be placed into the resource group. Then, a usage cap is placed on the resource group. Thus, all the applications in the resource group are treated as if they were a single application or process calling for the affected resource 115. The resource controller 125 then provide instructions to the throttle 110 as to what resource is subject to a usage limit, what that usage limit is, and the applications 105 that are collectively subject to that usage limit. The throttle 115 then controls the access of the applications 105 in the resource group to the designated resource 115. The term "user" refers to a person or persons having ownership or control over the system and/or one or more of the various applications.

For example, assume that the threshold for usage of the CPU 115A is 90%, and that applications 105A and 105B have now consumed 95% of the CPU availability. The CPU usage monitor 120B will report that usage to the resource controller 125. The resource controller 125 will then place at least applications 105A and 105B into a resource group and set the CPU usage limit for that resource group at some lesser value, say 60%. (The resource controller 125 can also place all applications of a similar type or having similar configuration properties into that resource group.) That lesser value can be predetermined, can be user-settable, or can be determined by some other process. The resource controller 125 reports, to the throttle 110, the applications 105 that are in the resource group, the resource 115 involved, and the new usage limit for that resource.

The throttle 110 then implements that information by restricting the availability of the CPU 115A to the resource group and, therefore, to those applications 105A, 105B in the resource group. For example, the throttle 110 can delay responding to a request for the CPU 115A from those applications 105A, 105B, might only allow those applications 105A, 105B to submit, say, 200 CPU operations and then be forced to wait while other applications are allowed to submit, say, 120 CPU operations, and then applications 105A, 105B can submit another 200 CPU operations, be forced to wait again, etc. Thus, other applications and operations, such as but not limited to system processes, recording events and/or data for an error log, etc., can occur in a timely manner.

The resource controller 125 monitors the usage of that resource (and the other resources as well). If the resource usage stays below the threshold value (as might be modified by any desired hysteresis value), then the applications are released from the resource group, i.e., unbundled, such as removing the applications from the resource group. The resource controller 125 notifies the throttle 110 of this action, and then the applications 105A and 105B can have unrestricted access to the CPU 115A, subject to any assigned hard cap resource usage limits and/or soft cap resource usage limits.

If the CPU usage then rises above the threshold again, then the applications currently using the CPU 115A are bundled again, i.e., placed in the resource group again. The applications currently using the CPU 115A will most likely be the same as those previously causing the overuse, but not necessarily. For example, application 105B might have terminated, and applications 105C-105G (not shown) might have begun, so applications 105A and 105C-105G will be placed in the resource group. The resource controller 125 will notify the throttle 110 of this action, and the throttle 110 will begin controlling the access of those applications in the resource group to the CPU 115A. Then, once the CPU usage has dropped to an acceptable level, the resource controller 125 will unbundle those applications, i.e., release those applications from the resource group. The resource controller 125 will also notify the throttle 110 of same.

If this process (detecting excessive resource consumption, bundling, waiting, unbundling) repeats more than a predetermined number of times in a predetermined period of time, such as but not limited to N times in a day (24-hour period) then the process is not having the desired long-term effect on resource consumption so a specified action, as described below, is taken. Similar monitoring and control is performed with respect to other resources, such as but not limited to memory 115B, I/O bus 115C, and shared resource(s) 115N.

For convenience of illustration and explanation, applications 105A-105N, throttle 110, monitors 120A-120N, and resource controller 155 are shown as separate components. In practice, however, these components are preferably, but not necessarily, implemented as software modules or processes running on the CPU 115A. Also, it will be appreciated that each instance of an application 105, or even multiple instances of an application 105, can be running on a different virtual machine (not shown for convenience of illustration), and there can be multiple virtual machines running on each CPU 115A.

Figure 2:
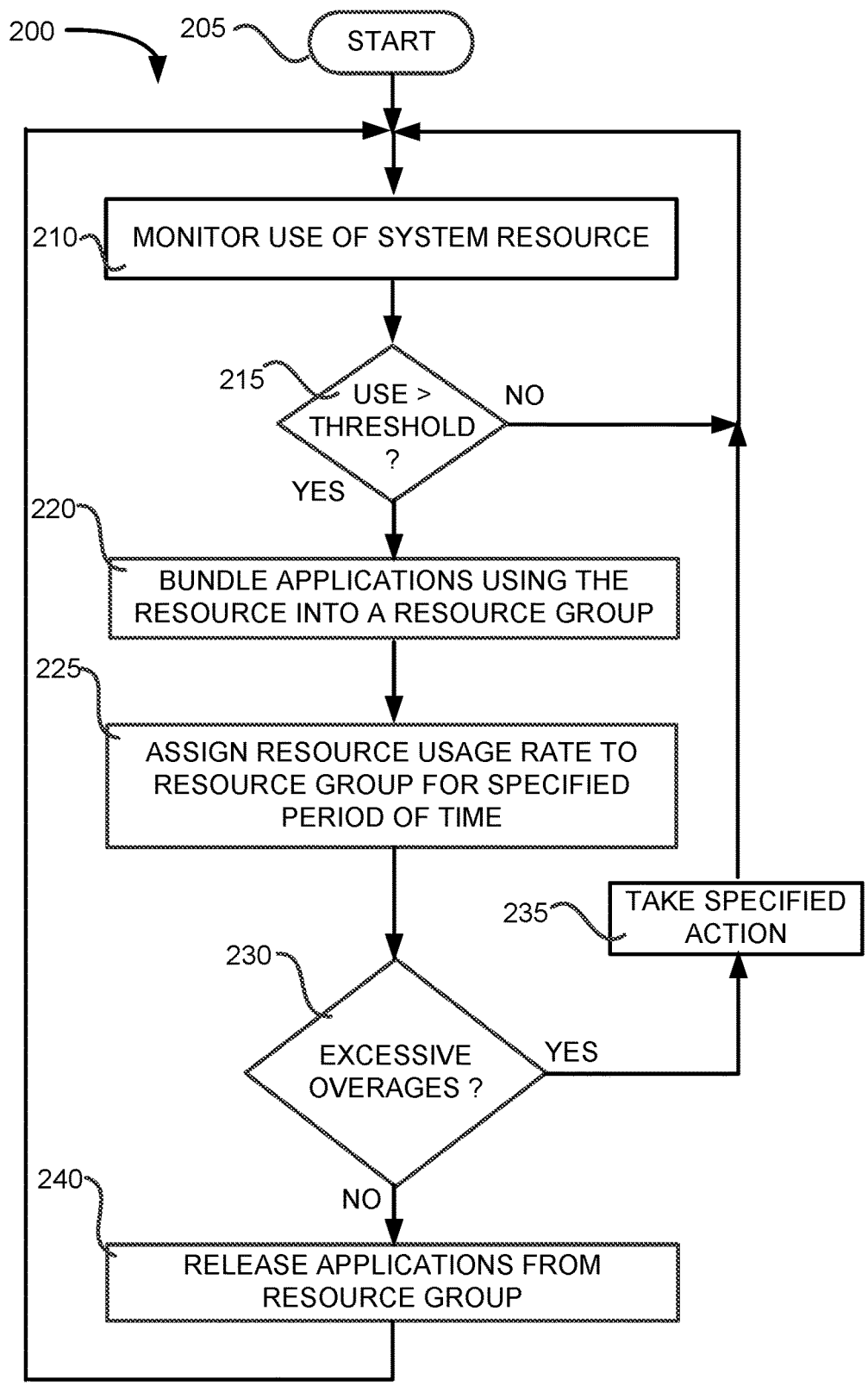
FIG. 2 is a flow diagram showing a routine that illustrates aspects of a process for controlling resource consumption, according to one implementation disclosed herein.

FIG. 2 is a flow diagram showing a routine 200 that illustrates aspects of the process for controlling resource consumption, according to one implementation disclosed herein. It should be appreciated that the logical operations described herein with regard to FIGS. 2 and 3 and the other FIGS. can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

Upon starting 205 the computing system boots up, performs typical start-up and administrative procedures, and begins running applications and/or accepting requests from consumers to run applications. The routine 200 then monitors 210 the use (consumption) of system resources. The monitoring process preferably monitors the use of the resource(s) over a predetermined period of time. The period of time can be fixed or might be user-selectable, such as by a human administrator overseeing and responsible for the operation of the computer system. A shorter period of time can be used, but if the monitoring period is too short then action can be taken on a transient event that does not have any significant effect on the operation of the system. A longer period of time can also be used, but if the monitoring period is too long then the cumulative effects from one or more resource-hungry applications can cause system slowness and/or crashes.

At decision 215 the routine 200 tests whether the resource usage has exceeded a resource usage threshold, such as but not limited to 95%. The usage threshold can be fixed or can be user-selectable, such as by a human administrator overseeing and responsible for the operation of the computer system. Too low a threshold might result in action being taken inappropriately. Too high a threshold can result in system slowness and/or crashes due to an event consuming all of the available resource, which prevents any other from having any access at all to the resource.

If, at decision 215, it is determined that the use is not greater than the threshold, then the routine 200 proceeds to 210 to continue monitoring the use of the system resource. If, at decision 215, it is determined that the use is greater than the threshold then the routine 200 assigns 220 the applications using that resource to a resource group identified for that specific resource. The routine 200 then assigns 225 a resource usage rate to that resource group for a specified period of time. The assigned resource usage rate can be a predetermined value, a predetermined value determined by the resource type, a predetermined value determined by the application type, or even a value determined by the current usage rate of those applications. For example, if the current usage rate of that resource by those applications is 40% then the assigned resource usage rate can be any value less than that current resource usage rate, such as 35%, 30%, 20%, 10%, or even less.

The resource usage rate and the specified period of time can be fixed, can be variable, or can be user-selectable, such as by a human administrator overseeing and responsible for the operation of the computer system. If the assigned resource usage rate is too low then the applications assigned to the resource module might perform sluggishly or might fail. Conversely, if the assigned resource usage rate is too high then the desired reduction in the resource might not be obtained. If the specified period of time is too short then, once the applications are released, the resource usage rate might quickly return to its previous level or to an unacceptable level. If the specified period of time is too long then the applications assigned to the resource module can perform sluggishly.

Also, the resource usage rate and the specified period of time can be changed each time that applications are assigned to the resource group. For example, each time that the specified resource usage rate is exceeded and applications are assigned to the resource group for that resource, then the assigned resource usage for that resource group can be decreased, and/or the specified period of time that the applications remain in the resource group can be increased. The increase or decrease can be linear or non-linear, and can be constrained to be within certain limits, and/or the resource usage rate and the specified period of time can be constrained to be within certain limits.

After the specified period then, at decision 230, the routine 200 tests whether there has been an excessive number of overages, that is, whether the use has been greater than the threshold more than a predetermined number of times, such as but not limited to five times. The number of times can be fixed or can be user-selectable, such as by a human administrator overseeing and responsible for the operation of the computer system. If the number of times is too low then the specified action, described below, can be taken unnecessarily. If the number of times is too high then the number of times that system slowness and/or crashes are experienced can be unacceptable.

If, at decision 230, excessive overages have occurred the routine 200 performs 235 a specified action and then proceeds to continue monitoring 210 the use of the system resource. The specified action can be, by way of example and not of limitation, increasing the amount of time that the applications are in the resource group, resetting the amount of time that the applications are in the resource group to a starting or default value, restricting the availability of the CPU to the designated applications in the resource group to a lower resource usage rate than before, resetting the resource usage rate to a starting or default value, increasing the time that the applications are assigned to the resource group, resetting the time that the applications are assigned to the resource group to a starting or default value, setting a flag that applications are not to be placed into that resource group again until after a specified time or event (e.g., 12:01 AM the next day, system reset, manual reset, etc.), notifying one or more persons having ownership or control over the affected application(s) that excessive resource consumption has occurred, etc. If, at decision 230, excessive overages have not occurred the routine 200 releases (unbundles) 240 the applications from the resource group and then continues monitoring 210 the use of the system resource.

In one configuration, the CPU 115A implements a Windows operating system, such as but not limited to Windows Server 2012, more preferably, Windows Server 2012 R2. When the CPU 115A begins operation, such as a startup, it creates one or more job objects for later use. These job objects are used to implement the resource groups. Initially, these job objects are empty. Later, as described herein, one or more applications 105 can be placed into (bundled) a job object, or removed (unbundled, released) from a job object. The job objects can be re-used. For example, a job object can be used to bundle a first group of applications for a first resource, that is, the job object is used for a first resource group, the applications are subsequently released from the job object, at which point the job object is empty/unused, and then that same job object can be used to again bundle a group of applications for a resource, which group of applications can be the same as the previous group of applications or can be a different group of applications, and the resource might be the same as the previous resource or can be a different resource. Also, in another configuration, the scheduling of operations of the various applications 105, whether placed in a job object or released from a job object, is not performed by the throttle 110, but is performed by the Windows scheduler.

As an example, assume that there are multiple instances of several applications running on the system, such as multiple instances of an email application, multiple instances of a word processing application, multiple instances of a spreadsheet application, etc. If the distress threshold for the CPU is 90% the, when the CPU usage hits 90%, the system will group the various applications by type (e.g., email application, word processing application, spreadsheet application, etc.), this can be done, for example, by inspecting the XML properties in the configuration file associated with each application.

The system will measure the CPU usage of each of the applications and sum the usages for each group of applications. For example, assume that the sum of the CPU usage for the email program group is 6%, the sum of the CPU usage for the word processing group is 25%, the sum of the CPU usage for the spreadsheet applications is 16%, etc. The system will place the email applications into one job object and set a limit of, for example, 1% for that job object. Thus, the email applications will now have a collective maximum limit (hard cap) of 1%. Similarly, the system will place the word processing applications into another job object and set a limit of, for example, 5% for that job object, and place the spreadsheet applications into yet another job object and set a limit of, for example, 3% for that job object. Thus, the word processing applications will now have a collective maximum limit (hard cap) of 5%, and the spreadsheet applications will now have a collective maximum limit (hard cap) of 3%. Thus, the CPU usage by these applications will be reduced from 47% to 9%, thus freeing up the CPU resource for other uses, such as system procedures, maintaining and clearing error logs, etc.

In another implementation, the amount of CPU usage is checked (sampling interval) every 15 seconds, and that usage is aggregated over a two-minute period (sampling duration). The aggregation can be the sum of the CPU usages, an average of the CPU usages, a weighted sum or weighted average of the CPU usages, etc. Also, the two-minute period can be discrete two-minutes (i.e., no overlap), can be overlapping two-minute periods, or can be a rolling two-minute period. If the aggregated CPU usage exceeds the distress threshold then action is taken, such as but not limited to steps 220 and 225 above.

Also, in one implementation, the specified time that applications are in a job object (bundling period) is 1 hour. In addition, in another configuration, the number of times that an application can be placed into a job object is three times (bundling limit). Preferably, these values (sampling interval, sampling duration, bundling period, bundling limit) are user-configurable. Also, these values can vary depending upon the time of day, the day of the week, the month, the recent history, etc. For example, the bundling period could be longer during periods of heavy use, and shorter during periods of lighter use.

The routines described herein can also be used along with conventional hard cap and soft cap resource limits for each program. For example, assume that one application has a hard cap, and another application has a soft cap, or even no cap. They would be permitted to operate in accordance with their respective caps until a distress threshold is reached. At that point they would be placed into job objects and then subject to their original cap as modified by the cap of the respective job object until they are released from the job objects.

For example, assume that an application has a hard cap of 20% and that it is placed into a job object with a cap of 14%. That application would no longer be allowed to use 20% of the resource, but would be further constrained by the job object cap of 14%, possibly further limited, however, by demands for the resource by other applications in that job object. If an application having a hard cap of, say, 10% is placed into a job object having a cap of 14%, then that application would still be limited to 10%, even if there were no other applications in the job object.

Also, in one implementation, a hard cap or a soft cap can be assigned to an application once the application is brought into a job object. In one implementation however, applications within a job object inherit the properties (caps) of the job object.

Also, in another configuration, with respect to the Microsoft™ Windows™ operating system, job object handles are preserved, even through a system recycle. The job object handles are preferably stored independently of the operating system. Then, when the system recycles, the job object handles are retrieved, so applications that were in a job object prior to the recycling are still in that job object.

Different software components can perform the different operations of the routine 200. For example, the operating system 422 can perform the start operation 205 and implement the applications 105, the monitors 120 can perform the monitoring operation 210, the resource controller 125 can perform operations 215, 220, 225, 230, and 240, the throttle 110 can assist in the performance of operation 225, and the resource controller 125 and/or the operating system 422 can perform operation 235.

Figure 3:
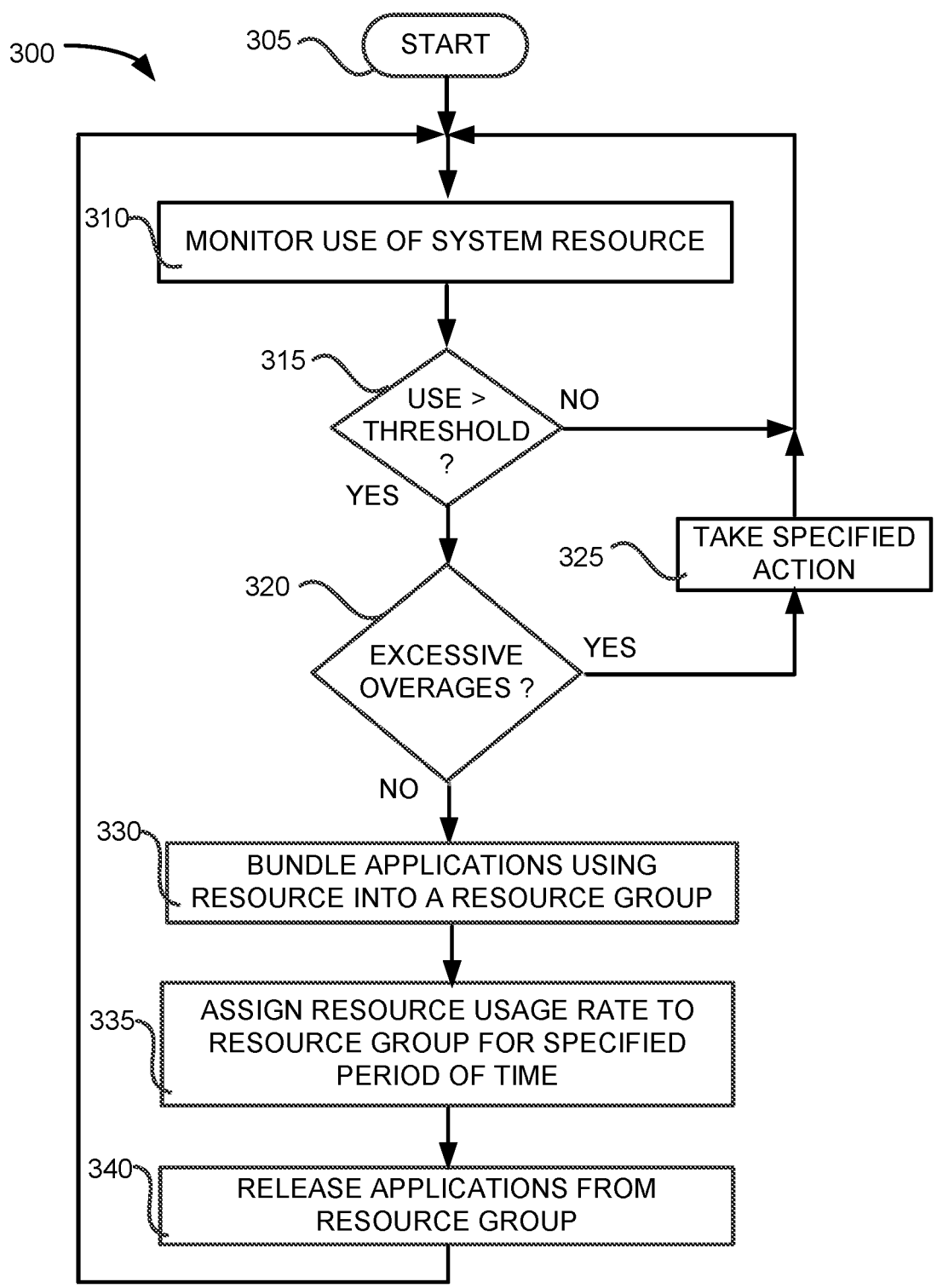
FIG. 3 is a flow diagram showing a routine that illustrates aspects of a process for controlling resource consumption, according to another implementation disclosed herein.

FIG. 3 is a flow diagram showing a routine 300 that illustrates aspects of a process for controlling resource consumption, according to another implementation disclosed herein. The routine 300 is similar to the routine 200 of FIG. 2 but differs in the order of certain operations. At operation 305, the computing system boots up, performs typical start-up and administrative procedures, and begins running applications and/or accepting requests from consumers to run applications. The routine 300 then monitors 310 the use (consumption) of system resources. At decision 315, the routine 300 tests whether the resource usage has exceeded the resource usage threshold.

If, at decision 315, the use is not greater than the threshold then the routine 300 proceeds to continue monitoring 310 the use of the system resource. If, at decision 315, the use is greater than the threshold then, at decision 320, the routine 300 tests whether there has been an excessive number of overages, that is, whether the use has been greater than the threshold more than a predetermined number of times. If, at decision 320, excessive overages have occurred the routine 300 performs 325 a specified action and the routine 300 then proceeds to continue monitoring 310 the use of the system resource.

If, at decision 320, excessive overages have not occurred then routine 300 bundles (assigns) 330 the applications using that resource to a resource group identified for that specific resource and the routine 300 assigns 335 a resource usage rate to that resource group for the specified period of time. The assigned resource usage rate can be determined as described above with respect to FIG. 2. Once the specified period of time has elapsed the routine 300 releases (unbundles) 340 the applications from the resource group, and the routine 300 then continues monitoring 310 the use of the system resource.

Different software components can perform the different operations of the routine 300, as discussed above with respect to FIG. 2.

Thus, in the routines of both FIGS. 2 and 3, when the use of a resource exceeds a usage threshold, applications using that resource are bundled by, for example, assigning them to a resource group that has a specified maximum resource usage rate, for a specified period of time. Those applications thus collectively share that specified maximum usage rate until that period of time has expired, during which time other processes have greater access to the resource.

It will be appreciated that the routines 200 and 300 of FIGS. 2 and 3, respectively, improve the operation of the computer by treating applications in a collective manner that reduces the likelihood that the computer will become sluggish, give errors, or fail. These routines also improve the operation of the computer by freeing up the resource so that other applications can use the resource. Further, if one or more of the collective applications requires the use of a first resource before it is ready to request the use of a second resource then, by limiting the ability of that application to access the first resource, the application will be delayed before it can request the second resource, thereby also freeing up the second resource for use by other applications.

Although FIGS. 2 and 3 discuss the monitoring of a single resource, it is contemplated and expected that multiple resources will be monitored, and action can be taken for one resource independent of actions taken with respect to another resource. In one implementation, if an application has been placed into a first resource group, it cannot be placed into a second resource group until after it has been released from the first resource group.

System processes and certain other processes are preferably exempt from this procedure, particularly if their inclusion in a job object will disrupt the operation of the computing system. That is, even if a system process uses a particular resource, and a job object is created for that particular resource, the system process will not be assigned to that job object and will not be subject to the maximum usage rate specified for that job object. This allows system processes and certain other processes to use the resources even when the applications assigned to the job object are prevented from using the resources. The system processes and other processes that are exempt are preferably specified by persons having ownership or control over the operation of the system or components thereof.

FIG. 4 is a computer architecture diagram that shows an illustrative computer hardware and software architecture for a computing system 400 capable of implementing aspects of the technologies presented herein. The illustrated architecture is representative of a server computer, or another type of computing device suitable for executing the software components presented herein.

Although a general purpose computer will have some of these components, such as a CPU 402, memory 404, a mass storage device 412, an input/output controller 414, and a network interface unit 418, and might be able to perform certain basic computer functions, such as addition and subtraction, a general purpose computer cannot perform, and does not perform, the various processes and functions described herein, and therefore cannot achieve the desired conservation of system resources. Rather, such a general purpose computer must be modified by adding the specialized programming described herein, which transforms it into a special purpose computer.

The software components described herein, particularly but not limited to the monitors 120, the resource controller 125, and the throttle 110, when loaded into the CPU 402 and executed, transform the CPU 402 and the overall computer 400 from a general-purpose computing system into a special-purpose computing system customized to facilitate the functionality presented herein. Such specialized programming also improves the operation and functioning of the computer itself by preventing excessive use of system resources from causing slow system operation and system failures. Such specialized programming also improves the operation and functioning of the computer itself by controlling the applications as group, rather than individually, thereby reducing the overhead used for application management and control.

In this regard, it should be appreciated that the computer 400 can be utilized to implement a computing device capable of executing the software components presented herein. For example, and without limitation, the computer 400 can be utilized to implement a computing device capable of executing the Windows server operating system, and/or any of the other software components described above.

The computer 400 includes a central processing unit 402 (CPU), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer 400, such as during startup, is stored in the ROM 408. The computer 400 further includes a mass storage device 412 for storing the operating system 422 and one or more programs including, but not limited to the applications 105, the monitors 120, the resource controller 125 and throttle 110, etc. The mass storage device 412 can also be configured to store other types of programs and data, such as default values, settings, list of exempt applications, list of applications subject to the procedure(s), etc.

The mass storage device 412 is connected to the CPU 402 through a mass storage controller (not shown) connected to the bus 410. The mass storage device 412 and its associated computer-readable storage media provide non-volatile storage for the computer 400. Although the description of computer-readable storage media contained herein refers to a mass storage device, such as a hard disk or CD-ROM drive, it should be appreciated by those skilled in the art that computer-readable storage media can be any available storage medium or media or communication medium or media that can be accessed by the computer 400 to retrieve instructions and/or data.

By way of example, and not limitation, computer-readable storage medium can include volatile and non-volatile, removable and non-removable media implemented in any method or technology for storage of information such as computer readable instructions, data structures, program modules or other data. For example, computer-readable storage medium includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other tangible medium that can be used to store the desired information and which can be accessed by the computer 400.

The terms computer-readable storage medium and computer-readable storage media, as used herein, comprise only statutory subject matter within the meaning of 35 U.S.C. § 101 as interpreted or defined by a court of competent jurisdiction. These terms do not, for example, encompass propagated waves per se or signals per se, nor do these terms encompass an interpretation that renders a claim invalid under 35 U.S.C. § 101.

Communication media does not include computer-readable storage media but does include computer readable instructions, data structures, program modules, or other data in a modulated data signal such as a carrier wave or other transport mechanism, and includes the delivery media, such as but not limited to transmitters, receivers, wiring, fiber optic lines, etc., associated therewith. The term "modulated data signal" means a signal that has one or more of its characteristics changed or set in a manner as to encode information in the signal. By way of example, and not limitation, communication media includes wired media such as a wired network or direct-wired connection, and the delivery media associated therewith, and wireless media such as acoustic, RF, infrared and other wireless media, and the delivery media associated therewith. Combinations of the any of the above should also be included within the scope of communication media.

According to various configurations, the computer 400 can operate in a networked environment using logical connections to remote computers through a network such as the network 416. The computer 400 can connect to the network 416 through a network interface unit 418 connected to the bus 410. It should be appreciated that the network interface unit 418 also can be utilized to connect to other types of networks and remote computer systems. In a typical environment, numerous consumers will use laptop computers, desktop computers, personal digital assistants, "slate" or tablet computing devices, smartphones, video game consoles, other types of mobile computing devices, and virtually any type of personal computing device (not shown), to connect to the computer 400 through the network 416 and request access to, and use, the various applications available on the computer 400.

The computer 400 also can include an input/output controller 414 for receiving and processing input from a number of other devices, including a keyboard, mouse, touch input, or electronic stylus (not shown in FIG. 4). Similarly, the I/O controller 414 can provide output to a display screen, a printer, or other type of output device (also not shown in FIG. 4). Thus, the I/O controller 414 provides for user input, such as for setting the different values discussed herein, and for presenting options, system information, resource usage, and other parameters for viewing and possible action by the user. The user can also access the computer 400 through the network interface unit 418 to perform these user actions.

The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein also can transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description.

In light of the above, it should be appreciated that many types of physical transformations take place in the computer 400 in order to store and execute the software components presented herein. It should also be appreciated that the architecture shown in FIG. 4 for the computer 400, or a similar architecture, can be utilized to implement other types of computing devices, including hand-held computers, embedded computer systems, mobile devices such as smartphones and tablets, and other types of computing devices known to those skilled in the art. It is also contemplated that the computer 400 might not include all of the components shown, can include other components that are not explicitly shown, or can utilize an architecture completely different than that shown.

FIG. 5 shows aspects of an illustrative distributed computing environment 502 in which the software components described herein can be executed. Thus, the distributed computing environment 502 illustrated in FIG. 5 can be used to execute program code, such as a virtual machine, applications 105, and/or other components operating within the system 102, capable of providing the functionality described herein with respect to FIGS. 1-4, and/or any of the other software components described herein. For example, and without limitation, the distributed computing environment 502 can be utilized to implement the functionality described herein as being provided by the system 102.

According to various implementations, the distributed computing environment 502 operates on, in communication with, or as part of a network 503, such as but not limited to network 416. One or more client devices 506A-506N (hereinafter referred to collectively and/or generically as "clients 506") can communicate with the distributed computing environment 502 via the network 503 and/or other connections (not illustrated in FIG. 5). Customers can utilize various aspects, features, system resources, applications, etc. of the system 102 by using, for example, such client devices 506.

In the illustrated configuration, the clients 506 include: a computing device 506A such as a laptop computer, a desktop computer, or other computing device; a "slate" or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the distributed computing environment 502. Two example computing architectures for the clients 506 are illustrated and described herein with reference to FIGS. 4 and 6. The architectures shown in FIGS. 4 and 6 can also be utilized to implement the system 102 described above. In this regard it should be understood that the illustrated clients 506 and computing architectures illustrated and described herein are illustrative, and should not be construed as being limited in any way.

In the illustrated configuration, the distributed computing environment 502 includes application servers 504, data storage 510, and one or more network interfaces 512. According to various implementations, the functionality of the application servers 504 can be provided by one or more server computers that are executing as part of, or in communication with, the network 503. The application servers 504 can host various services such as the virtual machines and applications 105 mentioned above, portals, and/or other resources. In the illustrated configuration, the application servers 504 host one or more virtual machines 514 for hosting applications 105 and/or network services, such as components operating within the system 102, or other types of applications and/or services. It should be understood that this configuration is illustrative, and should not be construed as being limiting in any way. The application servers 504 might also host or provide access to one or more web portals, link pages, web sites, and/or other information ("web portals") 516.

According to various implementations, the application servers 504 also include one or more mailbox services 518 and one or more messaging services 520. The mailbox services 518 can include electronic mail ("email") services, such as, but not limited to, those provided by the applications 105. The mailbox services 518 can also include various personal information management ("PIM") services including, but not limited to, calendar services, contact management services, collaboration services, and/or other services. The messaging services 520 can include, but are not limited to, instant messaging ("IM") services, chat services, forum services, and/or other communication services, such as, but not limited to, those provided by the applications 105.

The application servers 504 can also include one or more social networking services 522 provided by applications 105. The social networking services 522 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 522 are provided by other services, sites, and/or providers that might be referred to as "social networking providers." For example, some web sites allow users to interact with one another via email, chat services, and/or other means during various activities and/or contexts such as reading published articles, commenting on goods or services, publishing, collaboration, gaming, and the like. Other services are possible and are contemplated.

The social networking services 522 can also include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the configurations described above are illustrative, and should not be construed as being limited in any way.

As also shown in FIG. 5, the application servers 504 can also host other services, applications 105, and/or portals ("other services") 524, and/or other provide other resources. The other services 524 can include, but are not limited to, any of the other hardware and/or software components described herein. It thus can be appreciated that the distributed computing environment 502 can provide integration of the technologies disclosed herein with various mailbox, messaging, blogging, social networking, productivity, and/or other types of services or resources.

As mentioned above, the distributed computing environment 502 can include data storage 510. According to various implementations, the functionality of the data storage 510 is provided by one or more databases operating on, or in communication with, the network 503. The functionality of the data storage 510 can also be provided by one or more server computers configured to host data for the distributed computing environment 502. The data storage 510 can include, host, or provide one or more real or virtual datastores 526A-526N (hereinafter referred to collectively and/or generically as "datastores 526"). The datastores 526 are configured to host data used or created by the application servers 504, the applications 105, and/or other data.

The distributed computing environment 502 can communicate with, or be accessed by, the network interfaces 512. The network interfaces 512 can include various types of network hardware and software for supporting communications between two or more computing devices including, but not limited to, the clients 506 and the application servers 504. It should be appreciated that the network interfaces 512 can also be utilized to connect to other types of networks and/or computer systems.

It should be understood that the distributed computing environment 502 described herein can implement any aspects of the software elements described herein with any number of system resources and/or other distributed computing functionality that can be configured to execute any aspects of the software components disclosed herein. According to various implementations of the technologies disclosed herein, the distributed computing environment 502 provides some or all of the software functionality described herein as a service to the clients 506. It should be understood that the clients 506 can also include real or virtual machines including, but not limited to, server computers, web servers, personal computers, mobile computing devices, smart phones, and/or other devices. As such, various implementations of the technologies disclosed herein can enable any device configured to access the distributed computing environment 502 to utilize the functionality described herein.

FIG. 6 shows an illustrative computing device architecture 600 for a computing device that is capable of executing the various software components described herein. The computing device architecture 600 is applicable to computing devices that facilitate mobile computing due, in part, to form factor, wireless connectivity, and/or battery-powered operation. In some configurations, the computing devices include, but are not limited to, smart mobile telephones, tablet devices, slate devices, portable video game devices, and the like.

The computing device architecture 600 is also applicable to any of the clients 506 shown in FIG. 5. Furthermore, aspects of the computing device architecture 600 are applicable to traditional desktop computers, portable computers (e.g., laptops, notebooks, ultra-portables, and netbooks), server computers, and other computer systems, such as those described herein with reference to FIG. 5. For example, the single touch and multi-touch aspects disclosed herein below can be applied to desktop computers that utilize a touchscreen or some other touch-enabled device, such as a touch-enabled track pad or touch-enabled mouse. The computing device architecture 600 can also be utilized to implement the system 102, and/or other types of computing devices for implementing or consuming the functionality described herein.

The computing device architecture 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individual components illustrated in FIG. 6, the components can be connected electrically in order to interact and carry out device functions. In some configurations, the components are arranged so as to communicate via one or more busses (not shown).

The processor 602 includes one or more CPU cores configured to control system resources, process data, execute computer-executable instructions of one or more application programs 105, and to communicate with other components of the computing device architecture 600 in order to perform aspects of the functionality described herein. The processor 602 can be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 602 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 602 is, or is included in, a system-on-chip ("SoC") along with one or more of the other components described herein below. For example, the SoC can include the processor 602, a GPU, one or more of the network connectivity components 606, and one or more of the sensor components 608. In some configurations, the processor 602 is fabricated, in part, utilizing a package-on-package ("PoP") integrated circuit packaging technique. Moreover, the processor 602 can be a single core or multi-core processor.

The processor 602 can be created in accordance with an ARM architecture, available for license from ARM HOLDINGS of Cambridge, United Kingdom. Alternatively, the processor 602 can be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a RAM 614, a ROM 616, an integrated storage memory ("integrated storage") 618, and a removable storage memory ("removable storage") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 can be soldered or otherwise connected to a logic board upon which the processor 602 and other components described herein might also be connected. As such, the integrated storage 618 is integrated into the computing device. The integrated storage 618 can be configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

One or more of the memory components 604 can be used to store an operating system. According to various configurations, the operating system includes, but is not limited to, the WINDOWS MOBILE OS, the WINDOWS PHONE OS, or the WINDOWS OS from MICROSOFT CORPORATION, BLACKBERRY™ OS from RESEARCH IN MOTION™, LTD. of Waterloo, Ontario, Canada, IOS from APPLE™ Inc. of Cupertino, Calif., and ANDROID™ OS from GOOGLE™, Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, such as but not limited to network 416, which can be a WWAN, a WLAN, or a WPAN. Although a single network 628 is illustrated, the network connectivity components 606 can facilitate simultaneous communication with multiple networks. For example, the network connectivity components 606 can facilitate simultaneous communications with multiple networks via one or more of a WWAN, a WLAN, or a WPAN.

The network 628 can be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 628 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 can be configured to provide voice and/or data communications with any combination of the above technologies. The network 628 can be configured or adapted to provide voice and/or data communications in accordance with future generation technologies.

In some configurations, the WWAN component 622 is configured to provide dual-multi-mode connectivity to the network 628. For example, the WWAN component 622 can be configured to provide connectivity to the network 628, wherein the network 628 provides service via GSM and UMTS technologies, or via some other combination of technologies. Alternatively, multiple WWAN components 622 can be utilized to perform such functionality, and/or provide additional functionality to support other non-compatible technologies (i.e., incapable of being supported by a single WWAN component). The WWAN component 622 can facilitate similar connectivity to multiple networks (e.g., a UMTS network and an LTE network).

The network 628 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 628 via the WI-FI access points. Such connections can be secured via various encryption technologies including, but not limited, WI-FI Protected Access ("WPA"), WPA2, Wired Equivalent Privacy ("WEP"), and the like.

The network 628 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, might also be incorporated in the computing device architecture 600.

The magnetometer 630 is configured to measure the strength and direction of a magnetic field. In some configurations the magnetometer 630 provides measurements to a compass application program stored within one of the memory components 604 in order to provide a user with accurate directions in a frame of reference including the cardinal directions, north, south, east, and west. Similar measurements can be provided to a navigation application program that includes a compass component. Other uses of measurements obtained by the magnetometer 630 are contemplated.

The ambient light sensor 632 is configured to measure ambient light. In some configurations, the ambient light sensor 632 provides measurements to an application program stored within one of the memory components 604 in order to automatically adjust the brightness of a display (described below) to compensate for low light and bright light environments. Other uses of measurements obtained by the ambient light sensor 632 are contemplated.

The proximity sensor 634 is configured to detect the presence of an object or thing in proximity to the computing device without direct contact. In some configurations, the proximity sensor 634 detects the presence of a user's body (e.g., the user's face) and provides this information to an application program stored within one of the memory components 604 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some configurations, output from the accelerometer 636 is used by an application program as an input mechanism to control some functionality of the application program. In some configurations, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some configurations, output from the gyroscope 638 is used by an application program as an input mechanism to control some functionality of the application program. For example, the gyroscope 638 can be used for accurate recognition of movement within a 3D environment of a video game application or some other application. In some configurations, an application program utilizes output from the gyroscope 638 and the accelerometer 636 to enhance control of some functionality. Other uses of the gyroscope 638 are contemplated.

The GPS sensor 640 is configured to receive signals from GPS satellites for use in calculating a location. The location calculated by the GPS sensor 640 can be used by any application program that requires or benefits from location information. For example, the location calculated by the GPS sensor 640 can be used with a navigation application program to provide directions from the location to a destination or directions from the destination to the location. Moreover, the GPS sensor 640 can be used to provide location information to an external location-based service, such as E611 service. The GPS sensor 640 can obtain location information generated via WI-FI, WIMAX, and/or cellular triangulation techniques utilizing one or more of the network connectivity components 606 to aid the GPS sensor 640 in obtaining a location fix. The GPS sensor 640 can also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some configurations, the display 642 and the touchscreen 644 are combined. In some configurations two or more of the data I/O component 646, the audio I/O component 648, and the video I/O component 650 are combined. The I/O components 610 can include discrete processors configured to support the various interfaces described below, or might include processing functionality built-in to the processor 602.

The display 642 is an output device configured to present information in a visual form. In particular, the display 642 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 642 is a liquid crystal display ("LCD") utilizing any active or passive matrix technology and any backlighting technology (if used). In some configurations, the display 642 is an organic light emitting diode ("OLED") display. Other display types are contemplated.

The touchscreen 644 is an input device configured to detect the presence and location of a touch. The touchscreen 644 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 644 is incorporated on top of the display 642 as a transparent layer to enable a user to use one or more touches to interact with objects or other information presented on the display 642. In other configurations, the touchscreen 644 is a touch pad incorporated on a surface of the computing device that does not include the display 642. For example, the computing device can have a touchscreen incorporated on top of the display 642 and a touch pad on a surface opposite the display 642.

In some configurations, the touchscreen 644 is a single-touch touchscreen. In other configurations, the touchscreen 644 is a multi-touch touchscreen. In some configurations, the touchscreen 644 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 644. As such, a developer can create gestures that are specific to a particular application program.

In some configurations, the touchscreen 644 supports a tap gesture in which a user taps the touchscreen 644 once on an item presented on the display 642. The tap gesture can be used for various reasons including, but not limited to, opening or launching whatever the user taps, such as a graphical icon representing the collaborative authoring application 110. In some configurations, the touchscreen 644 supports a double tap gesture in which a user taps the touchscreen 644 twice on an item presented on the display 642. The double tap gesture can be used for various reasons including, but not limited to, zooming in or zooming out in stages. In some configurations, the touchscreen 644 supports a tap and hold gesture in which a user taps the touchscreen 644 and maintains contact for at least a pre-defined time. The tap and hold gesture can be used for various reasons including, but not limited to, opening a context-specific menu.

In some configurations, the touchscreen 644 supports a pan gesture in which a user places a finger on the touchscreen 644 and maintains contact with the touchscreen 644 while moving the finger on the touchscreen 644. The pan gesture can be used for various reasons including, but not limited to, moving through screens, images, or menus at a controlled rate. Multiple finger pan gestures are also contemplated. In some configurations, the touchscreen 644 supports a flick gesture in which a user swipes a finger in the direction the user wants the screen to move. The flick gesture can be used for various reasons including, but not limited to, scrolling horizontally or vertically through menus or pages. In some configurations, the touchscreen 644 supports a pinch and stretch gesture in which a user makes a pinching motion with two fingers (e.g., thumb and forefinger) on the touchscreen 644 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 644. As such, the above gestures should be understood as being illustrative and should not be construed as being limiting in any way.

The data I/O interface component 646 is configured to facilitate input of data to the computing device and output of data from the computing device. In some configurations, the data I/O interface component 646 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 648 is configured to provide audio input and/or output capabilities to the computing device. In some configurations, the audio I/O interface component 646 includes a microphone configured to collect audio signals. In some configurations, the audio I/O interface component 648 includes a headphone jack configured to provide connectivity for headphones or other external speakers. In some configurations, the audio interface component 648 includes a speaker for the output of audio signals. In some configurations, the audio I/O interface component 648 includes an optical audio cable out.

The video I/O interface component 650 is configured to provide video input and/or output capabilities to the computing device. In some configurations, the video I/O interface component 650 includes a video connector configured to receive video as input from another device (e.g., a video media player such as a DVD or BLU-RAY player) or send video as output to another device (e.g., a monitor, a television, or some other external display). In some configurations, the video I/O interface component 650 includes a High-Definition Multimedia Interface ("HDMI"), mini-HDMI, micro-HDMI, DISPLAYPORT, or proprietary connector to input/output video content. In some configurations, the video I/O interface component 650 or portions thereof is combined with the audio I/O interface component 648 or portions thereof.

The camera 652 can be configured to capture still images and/or video. The camera 652 can utilize a charge coupled device ("CCD") or a complementary metal oxide semiconductor ("CMOS") image sensor to capture images. In some configurations, the camera 652 includes a flash to aid in taking pictures in low-light environments. Settings for the camera 652 can be implemented as hardware or software buttons.

Although not illustrated, one or more hardware buttons can also be included in the computing device architecture 600. The hardware buttons can be used for controlling some operational aspect of the computing device. The hardware buttons can be dedicated buttons or multi-use buttons. The hardware buttons can be mechanical or sensor-based.

The illustrated power components 612 include one or more batteries 654, which can be connected to a battery gauge 656. The batteries 654 can be rechargeable or disposable. Rechargeable battery types include, but are not limited to, lithium polymer, lithium ion, nickel cadmium, and nickel metal hydride. Each of the batteries 654 can be made of one or more cells.

The battery gauge 656 can be configured to measure battery parameters such as current, voltage, and temperature. In some configurations, the battery gauge 656 is configured to measure the effect of a battery's discharge rate, temperature, age and other factors to predict remaining life within a certain percentage of error. In some configurations, the battery gauge 656 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 612 can also include a power connector (not shown), which can be combined with one or more of the aforementioned I/O components 610. The power components 612 can interface with an external power system or charging equipment via a power I/O component. Other configurations can also be utilized.

In view of the above, the disclosure presented herein also encompasses the subject matter set forth in the following clauses:

Clause 1: A computer-implemented method of controlling applications that use system resources, the method comprising: monitoring an indication of use of a system resource by a plurality of applications; determining whether the indication of use exceeds a predetermined threshold of use; if the indication of use exceeds the predetermined threshold of use: bundling the applications using the system resource into a resource group; and assigning a resource usage rate to the resource group for a first period of time, the assigned resource usage rate being below the indication of use of the system resource, and the assigned resource usage rate applying collectively to the applications in the resource group.

Clause 2: The computer-implemented method of clause 1 wherein the system resource comprises a hardware resource.

Clause 3: The computer-implemented method of clauses 1-2 wherein the system resource comprises a software resource.

Clause 4: The computer-implemented method of clauses 1-3 and further comprising: after the first period of time, determining whether an excessive number of overages of use of the system resource have occurred; and if the excessive number of overages of use has not occurred then removing the applications from the resource group.

Clause 5: The computer-implemented method of clauses 1-4 wherein monitoring an indication of use comprises monitoring use of the system resource over a second period of time.

Clause 6: The computer-implemented method of clauses 1-5 wherein monitoring an indication of use comprises obtaining a number of samples of use of the system resource by sampling use of the system resource at a predetermined interval for a predetermined number of times, and aggregating the samples.

Clause 7: The computer-implemented method of clauses 1-6 and further comprising creating a plurality of job objects upon startup, and wherein a resource group is a job object.

Clause 8: The computer-implemented method of clauses 1-7 and further comprising: after the first period of time, determining whether an excessive number of overages of use of the system resource have occurred; and if the excessive number of overages of use has occurred then taking a specified action.

Clause 9: The computer-implemented method of clauses 1-8 wherein taking the specified action comprises setting a flag that applications are not to be placed into the resource group again until after a specified time or after a specified event has occurred.

Clause 10: The computer-implemented method of clauses 1-9 wherein taking the specified action comprises increasing the amount of time that the applications are in the resource group.

Clause 11: The computer-implemented method of clauses 1-10 wherein taking the specified action comprises notifying at least one person that excessive resource consumption has occurred.

Clause 12: The computer-implemented method of clauses 1-11 wherein taking the specified action comprises reducing the usage rate assigned to the resource group.

Clause 13: The computer-implemented method of clauses 1-12 wherein monitoring an indication of use of a system resource comprises calling a kernel application programming interface to query resource utilization.

Clause 14: The computer-implemented method of clauses 1-13 wherein the assigned resource usage rate is below the predetermined threshold of use.

Clause 15: A computer-implemented method of controlling applications that use system resources, the method comprising: monitoring an indication of use of a system resource by a plurality of applications; determining whether the indication of use exceeds a predetermined threshold of use; if the indication of use exceeds the predetermined threshold of use then determining whether an excessive number of overages of use of the system resource have occurred; if the excessive number of overages of use of the system resource has not occurred then: bundling the applications using that resource into a resource group; and assigning a resource usage rate to the resource group for a first period of time, the assigned resource usage rate being below the indication of use of that resource, and the assigned resource usage rate applying collectively to the applications in the resource group.

Clause 16: The computer-implemented method of clause 15 wherein the system resource comprises a hardware resource.

Clause 17: The computer-implemented method of clauses 15-16 wherein the system resource comprises a software resource.

Clause 18: The computer-implemented method of clauses 15-17 wherein, if the excessive number of overages of use of the system resource has not occurred, then further comprising taking a specified action.

Clause 19: The computer-implemented method of clauses 15-18 wherein monitoring an indication of use comprises obtaining a number of samples of use of the system resource by sampling use of the system resource at a predetermined interval for a predetermined number of times, and aggregating the samples.

Clause 20: The computer-implemented method of clauses 15-19 and further comprising: after the first period of time, determining whether an excessive number of overages of use of the system resource have occurred; and if the excessive number of overages of use has occurred then taking a specified action.

Clause 21: The computer-implemented method of clauses 15-20 wherein monitoring an indication of use comprises monitoring use of the system resource over a second period of time.

Clause 22: The computer-implemented method of clauses 15-21 and further comprising creating a plurality of job objects upon startup, and wherein a resource group is a job object.

Clause 23: The computer-implemented method of clauses 15-22 wherein taking the specified action comprises setting a flag that applications are not to be placed into that resource group again until after a specified time or after a specified event has occurred.

Clause 24: The computer-implemented method of clauses 15-23 wherein taking the specified action comprises increasing the amount of time that the applications are in the resource group.

Clause 25: The computer-implemented method of clauses 15-24 wherein taking the specified action comprises providing a notification that excessive resource consumption has occurred.

Clause 26: The computer-implemented method of clauses 15-25 wherein taking the specified action comprises reducing the usage rate assigned to the resource group.

Clause 27: The computer-implemented method of clauses 15-26 wherein the assigned resource usage rate is below the predetermined threshold of use.

Clause 28: The computer-implemented method of clauses 15-27 wherein monitoring an indication of use of a system resource comprises calling a kernel application programming interface to query resource utilization.

Clause 29: An apparatus, comprising: a plurality of system resources; a processor; and at least one computer-readable storage medium having computer executable instructions stored thereon which, when executed by the processor, cause the apparatus to: run a plurality of applications; monitor an indication of use of a system resource of the plurality of system resources by the plurality of applications; determine whether the indication of use exceeds a predetermined threshold of use; if the indication of use exceeds the predetermined threshold of use: bundle the applications using the system resource into a resource group; and assign a resource usage rate to the resource group for a first period of time, the assigned resource usage rate being below the indication of use of that system resource, and the assigned resource usage rate applying collectively to the applications in the resource group.

Clause 30: The apparatus of clause 29 wherein the system resource comprises a hardware resource.

Clause 31: The apparatus of clauses 29-30 wherein the system resource comprises a software resource.

Clause 32: The apparatus of clauses 29-31 wherein the computer executable instructions on the at least one computer-readable storage medium further cause the apparatus to: after the first period of time, determine whether an excessive number of overages of use of the system resource have occurred; and if the excessive number of overages of use has not occurred then remove the applications from the resource group.

Clause 33: The apparatus of clauses 29-32 wherein the computer executable instructions on the at least one computer-readable storage medium further cause the apparatus to: after the first period of time, determine whether an excessive number of overages of use of the system resource have occurred; and if the excessive number of overages of use has occurred then take a specified action.

Clause 34: The apparatus of clauses 29-33 wherein the computer executable instructions on the at least one computer-readable storage medium further cause the apparatus to monitor use of the system resource over a second period of time.

Clause 35: The apparatus of clauses 29-34 wherein the computer executable instructions on the at least one computer-readable storage medium further cause the apparatus to monitor use of the system resource over a second period of time by executing instructions to: obtain a number of samples of use of the system resource by sampling use of the system resource at a predetermined interval for a predetermined number of times; and aggregate the samples.

Clause 36: The apparatus of clauses 29-35 wherein the computer executable instructions on the at least one computer-readable storage medium further cause the apparatus to take the specified action by executing instructions to set a flag that applications are not to be placed into that resource group again until after a specified time or until after a specified event has occurred.

Clause 37: The apparatus of clauses 29-36 wherein the computer executable instructions on the at least one computer-readable storage medium further cause the apparatus to take the specified action by executing instructions to increase the amount of time that the applications are in the resource group.

Clause 38: The apparatus of clauses 29-37 wherein the computer executable instructions on the at least one computer-readable storage medium further cause the apparatus to provide a notification that excessive system resource consumption has occurred.

Clause 39: The apparatus of clauses 29-38 wherein the computer executable instructions on the at least one computer-readable storage medium further cause the apparatus to create a plurality of job objects upon startup, and wherein a resource group is a job object.

Clause 40: The apparatus of clauses 29-39 wherein the computer executable instructions on the at least one computer-readable storage medium further cause the apparatus to create a kernel application programming interface to query system resource utilization and to monitor an indication of use of a system resource of the plurality of resources by calling the kernel application programming interface.

Clause 41: The apparatus of clauses 29-40 wherein the computer executable instructions on the at least one computer-readable storage medium further cause the apparatus to assign the resource usage rate to be below the predetermined threshold of use.

Clause 42: A computer-readable storage medium having computer executable instructions stored thereon which, when executed by a processor, cause the processor to: run a plurality of applications; monitor an indication of use of a system resource of the plurality of resources by the plurality of applications; determine whether the indication of use exceeds a predetermined threshold of use; if the indication of use exceeds the predetermined threshold of use: bundle the applications using the system resource into a resource group; and assign a resource usage rate to the resource group for a first period of time, the assigned resource usage rate being below the indication of use of that system resource, and the assigned resource usage rate applying collectively to the applications in the resource group.

Clause 43: The computer-readable storage medium of clause 42 wherein the system resource comprises a hardware resource.

Clause 44: The computer-readable storage medium of clauses 42-43 wherein the system resource comprises a software resource.

Clause 45: The computer-readable storage medium of clauses 42-44 wherein the computer executable instructions stored thereon, when executed by a processor, further cause the processor to: after the first period of time, determine whether an excessive number of overages of use of the system resource have occurred; and if the excessive number of overages of use has not occurred then remove the applications from the resource group.

Clause 46: The computer-readable storage medium of clauses 42-45 wherein the computer executable instructions stored thereon, when executed by a processor, further cause the processor to: after the first period of time, determine whether an excessive number of overages of use of the system resource have occurred; and if the excessive number of overages of use has occurred then take a specified action.

Clause 47: The computer-readable storage medium of clauses 42-46 wherein the computer executable instructions stored thereon, when executed by a processor, further cause the processor to monitor use of the system resource over a second period of time.

Clause 48: The computer-readable storage medium of clauses 42-47 wherein the computer executable instructions stored thereon, when executed by a processor, further cause the processor to monitor use of the system resource over a second period of time by executing instructions to obtain a number of samples of use of the system resource by sampling use of the system resource at a predetermined interval for a predetermined number of times; and aggregate the samples.

Clause 49: The computer-readable storage medium of clauses 42-48 wherein the computer executable instructions stored thereon, when executed by a processor, further cause the processor to monitor use of the system resource over a second period of time by executing instructions to take the specified action by executing instructions to set a flag that applications are not to be placed into that resource group again until after a specified time or after a specified event has occurred.

Clause 50: The computer-readable storage medium of clauses 42-49 wherein the computer executable instructions stored thereon, when executed by a processor, further cause the processor to take the specified action by executing instructions to increase the amount of time that the applications are in the resource group.

Clause 51: The computer-readable storage medium of clauses 42-50 wherein the computer executable instructions stored thereon, when executed by a processor, further cause the processor to provide a notification that excessive resource consumption has occurred.

Clause 52: The computer-readable storage medium of clauses 42-51 wherein the computer executable instructions stored thereon, when executed by a processor, further cause the processor to create a plurality of job objects upon startup, and wherein a resource group is a job object.

Clause 53: The computer-readable storage medium of clauses 42-52 wherein the computer executable instructions stored thereon, when executed by a processor, further cause the processor to create a kernel application programming interface to query system resource utilization and to monitor an indication of use of a system resource of the plurality of resources by calling the kernel application programming interface.

Clause 54: The computer-readable storage medium of clauses 42-53 wherein the computer executable instructions stored thereon, when executed by a processor, further cause the processor to assign the resource usage rate to be below the predetermined threshold of use.

It should be appreciated that the various software components described herein can be implemented using or in conjunction with binary executable files, dynamically linked libraries (DLLs), APIs, network services, script files, interpreted program code, software containers, object files, bytecode suitable for just-in-time ("JIT") compilation, and/or other types of program code that can be executed by a processor to perform the operations described herein with regard to FIGS. 1-4. Other types of software components not specifically mentioned herein can also be utilized.

Technologies for controlling applications that use system resources, and conserving those system resources, have been disclosed herein. Although the subject matter presented herein has been described in language specific to computer structural features, methodological and transformative acts, specific computing machinery, and computer readable media, it is to be understood that the description above is provided by way of illustration or example only, and should not be construed as limiting. Rather, the specific features, acts and media are disclosed as example forms of implementing the claims and various modifications and changes can be made to the implementations described herein while still being within the true spirit and scope of the claims. Further, it should be appreciated that the above-described subject matter can be implemented as a computer-controlled apparatus, a computer process, a computing system, or as an article of manufacture such as a computer-readable storage medium. Therefore, the subject matter defined in the appended claims is not necessarily limited to the specific features, acts, or media described herein.

What is claimed is:

1. A computer-implemented method of controlling applications that use system resources, the method comprising:
    monitoring an indication of use of a system resource by a plurality of applications;
    determining, by a hardware processor, whether the indication of use exceeds a predetermined threshold of use for the system resource; and
    responsive to a determination that the indication of use exceeds the predetermined threshold of use:
        bundling applications of the plurality of applications that are of a same application type into a resource group;
        assigning a resource usage rate to the resource group for a first period of time, the assigned resource usage rate being below the indication of use of the system resource; and
        transmitting, to a throttle, the assigned resource usage rate, an indication of the applications in the resource group, and an indication of the system resource subject to the assigned resource usage rate, the transmitting causing the throttle to restrict usage of the system resource based on the assigned resource usage rate by collectively throttling access by the applications in the resource group to the system resource as if the applications in the resource group were a single application calling for the system resource.

2. The computer-implemented method of claim 1 wherein the bundling the applications into the resource group comprises inspecting XML properties in a configuration file associated with each of the plurality of applications.

3. The computer-implemented method of claim 1 wherein the system resource comprises a software resource or a hardware resource.

4. The computer-implemented method of claim 1 further comprising:
    after the first period of time, determining whether an excessive number of overages of use of the system resource have occurred; and responsive to determining that the excessive number of overages of use has not occurred, removing the applications from the resource group.

5. The computer-implemented method of claim 1 wherein monitoring the indication of use comprises monitoring use of the system resource over a second period of time.

6. The computer-implemented method of claim 1 wherein monitoring the indication of use comprises obtaining a number of samples of use of the system resource by sampling use of the system resource at a predetermined interval for a predetermined number of times, and aggregating the samples.

7. The computer-implemented method of claim 1 further comprising creating a plurality of empty job objects upon startup, wherein the resource group is generated by bundling the application into an empty job object of the plurality of empty job objects.

8. The computer-implemented method of claim 1 further comprising:
after the first period of time, determining whether an excessive number of overages of use of the system resource have occurred; and
responsive to determining that the excessive number of overages of use has occurred, taking a specified action.

9. The computer-implemented method of claim 8 wherein taking the specified action comprises setting a flag that further applications are not to be placed into the resource group again until after a specified time or until after a specified event has occurred.

10. The computer-implemented method of claim 8 wherein taking the specified action comprises increasing an amount of time that applications are in the resource group.

11. A computer-implemented method of controlling applications that use system resources, the method comprising:
monitoring an indication of use of a system resource by a plurality of applications;
determining whether the indication of use exceeds a predetermined threshold of use for the system resource;
in response to determining that the indication of use exceeds the predetermined threshold of use, determining whether an excessive number of overages of use of the system resource have occurred; and
in response to determining that the excessive number of overages of use of the system resource has not occurred:
bundling applications of the plurality of applications that are of a same application type into a resource group;
assigning a resource usage rate to the resource group for a first period of time, the assigned resource usage rate being below the indication of use of the system resource; and
transmitting, to a throttle, the assigned resource usage rate, an indication of the applications in the resource group, and an indication of the system resource subject to the assigned resource usage rate, the transmitting causing the throttle to restrict usage of the system resource based on the assigned resource usage rate by collectively throttling access by the applications in the resource group to the system resource as if the applications in the resource group were a single application calling for the system resource.

12. The computer-implemented method of claim 11 further comprising, in response to determining that the excessive number of overages of use of the system resource has not occurred, taking a specified action.

13. The computer-implemented method of claim 11 wherein monitoring the indication of use comprises obtaining a number of samples of use of the system resource by sampling use of the system resource at a predetermined interval for a predetermined number of times, and aggregating the samples.

14. An apparatus, comprising:
a plurality of system resources;
one or more processors; and
at least one computer-readable storage medium having computer executable instructions stored thereon which, when executed by the one or more processors, cause the one or more processors to perform operations comprising:
running a plurality of applications;
monitoring an indication of use of a system resource of the plurality of system resources by the plurality of applications;
determining whether the indication of use exceeds a predetermined threshold of use for the system resource;
responsive to a determination that the indication of use exceeds the predetermined threshold of use:
bundling applications of the plurality of applications that are of a same application type into a resource group;
assigning a resource usage rate to the resource group for a first period of time, the assigned resource usage rate being below the indication of use of the system resource; and
transmitting, to a throttle, the assigned resource usage rate, an indication of the applications in the resource group, and an indication of the system resource subject to the assigned resource usage rate, the transmitting causing the throttle to restrict usage of the system resource based on the assigned resource usage rate by collectively throttling access by the applications in the resource group to the system resource as if the applications in the resource group were a single application calling for the system resource.

15. The apparatus of claim 14 wherein the operations further comprise:
after the first period of time, determining whether an excessive number of overages of use of the system resource have occurred; and
in response to determining that the excessive number of overages of use has not occurred, removing the applications from the resource group.

16. The apparatus of claim 14 wherein the operations further comprise:
after the first period of time, determining whether an excessive number of overages of use of the system resource have occurred; and
in response to determining that the excessive number of overages of use has occurred, taking a specified action.

17. The apparatus of claim 16 wherein taking the specified action comprises setting a flag that further applications are not to be placed into the resource group again until after a specified time or after a specified event has occurred.

18. The apparatus of claim 16 wherein taking the specified action comprises increasing the amount of time that the applications are in the resource group.

19. The apparatus of claim 14 wherein the operations further comprise monitoring use of the system resource over a second period of time.

20. The apparatus of claim 14 wherein the operations further comprise monitoring use of the system resource over a second period of time, the monitoring over the second period of time comprising:
- obtaining a number of samples of use of the system resource by sampling use of the system resource at a predetermined interval for a predetermined number of times; and
- aggregating the samples.

* * * * *